United States Patent [19]
Foote

[11] Patent Number: 5,763,779
[45] Date of Patent: Jun. 9, 1998

[54] ACCELEROMETER WITH IMPROVED SUPPORT RIM ISOLATION

[75] Inventor: Steven A. Foote, Issaquah, Wash.

[73] Assignee: AlliedSignal, Inc., Morristown, N.J.

[21] Appl. No.: 725,193

[22] Filed: Sep. 13, 1996

Related U.S. Application Data

[63] Continuation of Ser. No. 386,042, Feb. 9, 1995, abandoned.

[51] Int. Cl.⁶ .................................................. G01P 15/08
[52] U.S. Cl. ........................ 73/497; 73/514.23; 73/514.36
[58] Field of Search ............................ 73/497, 514.21, 73/514.23, 514.36

[56] References Cited

U.S. PATENT DOCUMENTS

| | | | |
|---|---|---|---|
| 4,592,234 | 6/1986 | Norling | 73/514.23 |
| 4,658,174 | 4/1987 | Albert | 310/323 |
| 4,726,228 | 2/1988 | Norling | 73/497 |
| 4,919,993 | 4/1990 | Woodruff | 73/514.36 |
| 5,191,794 | 3/1993 | Abbink et al. | 73/514 |

FOREIGN PATENT DOCUMENTS

| | | |
|---|---|---|
| 0 268 351 | 5/1988 | European Pat. Off. |
| 91/19987 | 12/1991 | WIPO |

*Primary Examiner*—John E. Chapman

[57] ABSTRACT

An accelerometer is of the type in which a paddle is suspended from a support so that the paddle is displaceable with respect to the support. A suspension arrangement for the paddle includes a pair of compliant beams having longitudinal axes that are substantially orthogonal to each other so that the beams provide compliant isolation to internal stresses while being rigid to external loading forces.

10 Claims, 3 Drawing Sheets

ACCELEROMETER WITH IMPROVED SUPPORT RIM ISOLATION

This application is a continuation of Ser. No. 08/386,042 filed on Feb. 9, 1995, abandoned.

BACKGROUND OF THE INVENTION

This invention relates to accelerometers of the type wherein a force rebalance coil is mounted to a proof mass suspended on an annular support rim. More particularly, this invention relates to isolating the support rim from stresses propagating through the rim which cause accelerometer bias error and instability thereby tending to degrade the high performance potential of the accelerometer.

A prior art accelerometer with high performance potential is described in U.S. Pat. No. 3,702,073 which issued to Jacobs on Nov. 7, 1972, and which description is incorporated herein by reference. Essentially, the Jacobs accelerometer comprises three primary components: a reed and upper and lower stators or magnetic circuits between which the reed is supported. The reed includes a pivotable paddle that is suspended via flexures to an outer annular support ring such that the paddle can pivot with respect to the support ring. The paddle flexures and support rim are commonly provided as a unitary structure composed of fused quartz. A plurality of mounting pads are in spaced relation around the upper and lower surfaces of the support rim. These mounting pads mate with inwardly facing surfaces of the upper and lower stators when the accelerometer is assembled.

Both upper and lower surfaces of the paddle include capacitor plates and force rebalance coils, i.e. torque coils. Each coil is positioned such that its central axis is normal to the paddle and parallel to the sensing axis of the accelerometer. Each is generally cylindrical and has a bore provided in its inwardly facing surface. A permanent magnet is contained within the bore. The bore and permanent magnet are configured such that an associated one of the force rebalance coils mounted on the paddle fits within the bore with the permanent magnet being positioned within the cylindrical core of the coil. Current flowing through the coil produces a magnetic field that interacts with the permanent magnet to produce a force on the paddle. Also provided on the inwardly facing surfaces of the stators are capacitor plates configured to form capacitors with the capacitor plates on the top and bottom surfaces of the paddle. Movement of the paddle with respect to the upper and lower stators results in a differential capacitance change.

In operation, the accelerometer is affixed to an object whose acceleration is to be measured. Acceleration of the object along the sensing axis results in pendulous displacement of the paddle, coils and capacitor plates with respect to the support rim and the stators. The paddle coils and capacitor plates are collectively referred to as a proof mass. The resulting differential capacitance change caused by this displacement is sensed by a feedback circuit. In response, the feedback circuit produces a current that when applied to the force rebalance coils tends to return the proof mass to its neutral position. The magnitude of the current required to maintain the proof mass in its neutral position provides a measure of acceleration along the sensing axis.

An important characteristic of an accelerometer of the type described is its immunity to errors due to stresses. One type stress to which these accelerometers are subjected is thermal stress. Thermal stress results from the fact that different parts of the accelerometer are composed of materials that have different coefficients of thermal expansion. For example, the reed is preferably fabricated of fused quartz, whereas the coil is typically configured of copper and may be mounted on an aluminum coil form. The coefficient of thermal expansion of the several materials differs so that a temperature change will result in stress at the paddle/coil or paddle/coil form interface. This stress can warp the paddle and the flexures that mount the paddle and result in offset and hysteresis errors in the accelerometer output.

U.S. Pat. No. 5,111,694 which issued to the present inventor on May 12, 1992 describes an accelerometer featuring a coil mounting approach that minimizes thermal stress and is also light in weight so as to be well adapted for use in high performance accelerometers, and which description is incorporated herein by reference.

Another type of stress which accelerometers of the type described are subjected to is stress which propagates from the mounting pads through the support rim to a back plane supporting the flexures. These stresses result in the aforementioned bias error and instability. Accordingly, it is desireable to make the support rim highly compliant to minimize these propagated stresses. However, high support rim also lowers the mechanical resonance frequency which in turn produces errors and can be physically destructive to the accelerometer. It follows that a design compromise must be made as to the compliance or rigidity of the support rim.

Many specifications for high performance accelerometers require mechanical resonances to be above 2,000 Hz. It has been found that a design featuring a thin support rim gives better bias performance but with a mechanical resonance of only 1300 Hz. This can restrict the application of the accelerometer.

A common configuration of accelerometers of the type described has the support rim following the outer perimeter of the reed from the mounting pads to a back plane behind the flexures. This puts the back plane at the end of two compliant cantilever beams which are essentially in parallel. While providing isolation from propagated stresses, this system has a very low resonance frequency for cross-axis loading. Additionally, a parallelogram motion rotates the direction of the output and pendulous axes of the accelerometer about the input axis.

The present invention provides a configuration which overcomes the aforementioned obvious disadvantages of prior art accelerometers subjected to stresses which propagate from the mounting pads through the support rim to the back plane supporting the flexures.

SUMMARY OF THE INVENTION

This invention contemplates an accelerometer with improved support rim isolation wherein the two compliant cantilever beams are rotated in the support rim such that the beams are orthogonal rather than parallel as is heretofore been the case. Additionally the crossover point of the orthogonally disposed beams is made coincident with the center of percussion of the supported mass. Thus, the rotational moment due to external cross-axis loading is zero whereby the loading of the beams due to external forces will be in a straight tension or compression mode and in which mode the beams are rigid. At the same time, internal stress forces applied through the mounting pads are applied laterally to the beams in their direction of compliance. Thus, with the configuration as described, the beams can provide compliant isolation to internal stresses and yet be extremely rigid to external loading forces.

DETAILED DESCRIPTION OF THE INVENTION

Figure 1:
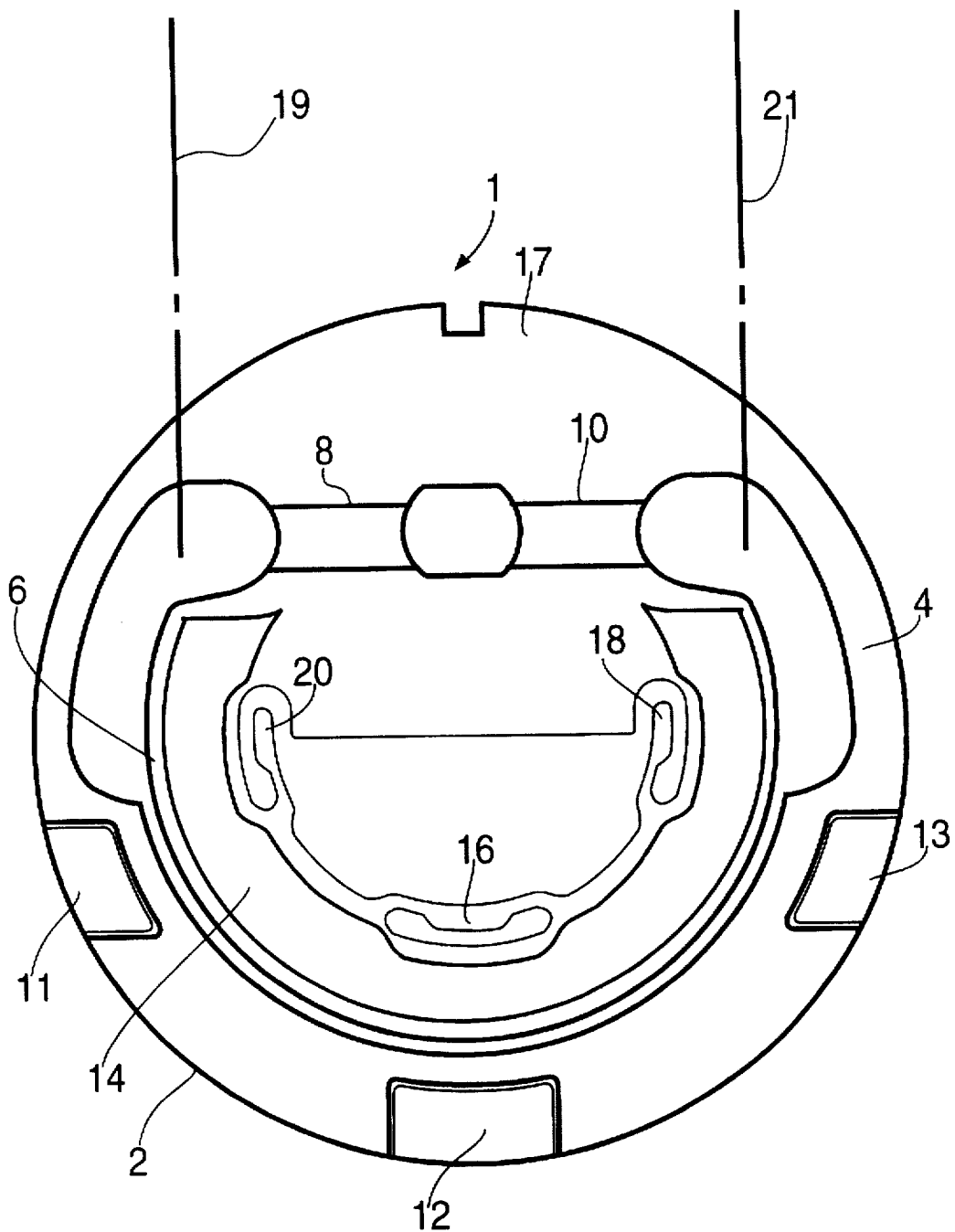
FIG. 1 is a diagrammatic representation of a prior art accelerometer, wherein only the components of the accelerometer that are relevant to the present invention are shown and described.

With the description of the prior art accelerometer illustrated and described in the aforementioned U.S. Pat. No. 5,111,694 in mind, and which description is incorporated herein by reference as noted, reference is first made to FIG. 1 which illustrates a prior art accelerometer designated by the numeral 1. Accelerometer 1 includes a reed 2, and which reed 2 includes an outer annular support rim 4 and a paddle 6 supported from the support rim by flexures 8 and 10. Support rim 4 includes a plurality of mounting pads, shown as three in number and designated by the numerals 11, 12 and 13, on its upper surface. A like plurality of mounting pads (not shown) are on the lower surface of support rim 4. The mounting pads mate with inwardly facing surfaces of an upper stator 22 and a lower stator 23.

A capacitor plate 14 is disposed on the upper surface of paddle 6 and a similar capacitor plate (not shown) is disposed on the lower surface of the paddle. A plurality of isolated coil mounting pads shown as three in number and designated by the numerals 16, 18 and 20 on one side of paddle 6 cooperate with a like plurality of isolated coil mounting pads (not shown) on the other side of the paddle for mounting force rebalance coils (not shown) to the paddle.

With the arrangement described, support rim 4 follows the outer perimeter of reed 2 from mounting pads 11, 12 and 13 to a back plane 17 behind flexures 8 and 10. With this arrangement, back plane 17 is essentially at the end of two compliant cantilever beams, represented by their axes 19 and 21, which are in substantially parallel relationship. While providing isolation, the arrangement has a very low resonance frequency for cross-axis loading as may be required. Additionally, a parallelogram motion rotates the direction of the output and pendulous axes of the accelerometer about the accelerometer input axis.

Figure 2:
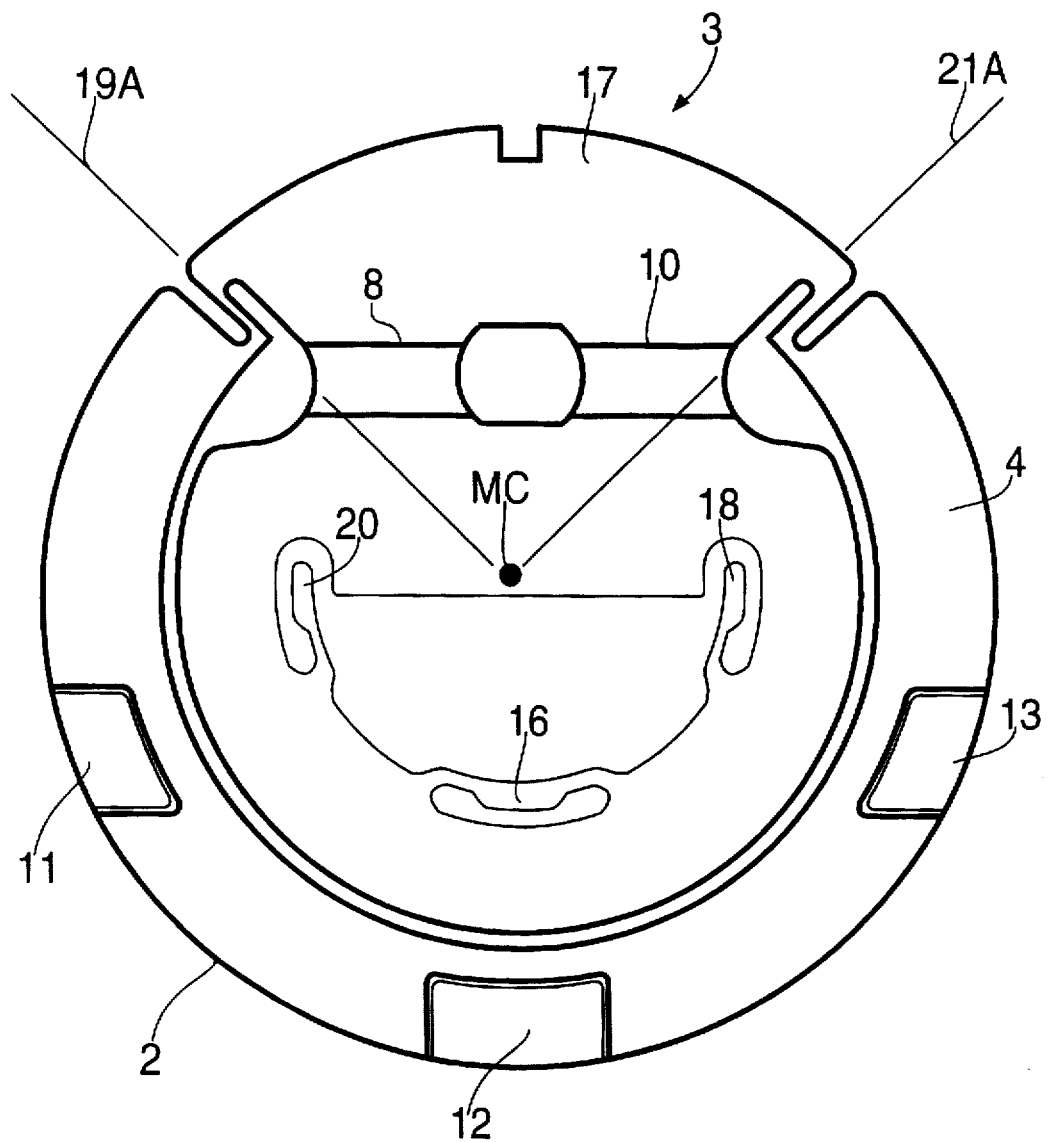
FIG. 2 is a diagrammatic representation illustrating an accelerometer in accordance with the invention, wherein only the components of the accelerometer relevant to understanding the invention are shown and described.
Figure 3:
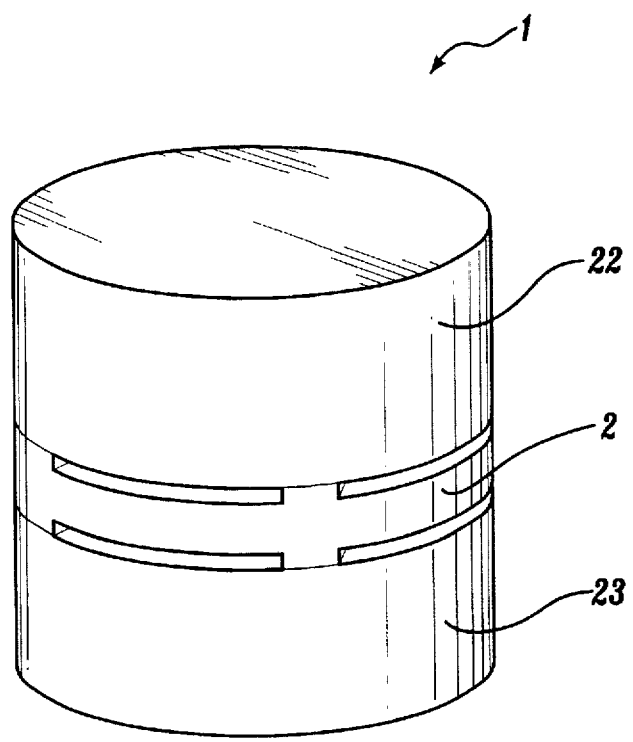
FIG. 3 is an isometric illustration of an accelerometer in accordance with the invention, wherein only the reed and upper and lower stators are shown and described.

With reference to FIG. 2, an accelerometer 3 in accordance with the present invention is shown. Elements of accelerometer 3 common to those of prior art accelerometer 1 carry corresponding numerical designations.

Thus, the two compliant beams in support rim 4, represented by their axes 19A and 21A are rotated so that they are in substantially orthogonal relationship as illustrated rather than substantially parallel relationship as illustrated in FIG. 1. Additionally, the cross-over point of the orthogonal beams is coincident with the center of mass (MC) of a supported mass. The result is that the rotational moment due to external cross-axis loading is zero. Thus, the loading of the beams due to external forces will be in a straight tension or compression mode and the beams are rigid. Simultaneously, internal stress forces applied through mounting pads 11, 12 and 13 are applied laterally to the beams in their direction of compliance. Hence, with the described configuration, the beams can provide compliant isolation to internal clamping stresses and yet be rigid to external loading forces.

Thus, in consideration of the fact that stresses propagate from the mounting pads through the support rim to the back plane supporting the flexures, bias error and instability is eliminated by the configuration of the present invention. The present invention is seen to achieve an advantageous compromise between making the support rim highly compliant to minimize the propagated stresses while maintaining a desired mechanical resonance frequency.

With the above description of the invention in mind, reference is made to the claims appended hereto for a definition of the scope of the invention.

What is claimed is:

1. An improved reed and proof mass assembly in an accelerometer of the type in which a paddle is suspended from support means by suspension means so that the paddle is pivotable with respect to the support means, and wherein the suspension means comprises a pair of compliant beams, the improvement comprising:

the compliant beams having longitudinal axes in the plane of said paddle that are substantially orthogonal to each other, whereby the beams provide compliant isolation to internal stresses while being rigid to external loading forces.

2. An improved reed and proof mass assembly in an accelerometer of the type in which a paddle is suspended from support means by suspension means so that the paddle is displaceable with respect to the support means, and wherein the suspension means comprises a pair of compliant beams, the improvement comprising:

the compliant beams having longitudinal axes that are substantially orthogonal to each other, whereby the beams provide compliant isolation to internal stresses while being rigid to external loading forces; and wherein:

the cross-over point of the orthogonal beam axes is coincident with the center of mass of a supported mass, whereby a rotational moment due to the external cross-axis loading is substantially zero.

3. The improvement as described by claim 1, wherein:

a mode of loading of the beams due to external loading forces is substantially a tension mode for one of the pair of beams and substantially a compression mode for the other of the pair of beams, whereby the beams are rigid to said external loading forces.

4. The improvement as described by claim 1, wherein:

internal stress forces are applied laterally to the beams in the direction of compliance of said beams.

5. A force rebalance accelerometer, comprising:

a pivotable paddle;

support means;

means for suspending the pivotable paddle from the support means so that the paddle is pivotable with respect to said support means;

the means for suspending the pivotable paddle from the support means including a pair of compliant beams; and the compliant beams having longitudinal axes in the plane of said paddle that are substantially orthogonal to each other, whereby the beams provide compliant isolation to internal forces while being rigid to external loading forces.

6. A force rebalance accelerometer, comprising:

a paddle;

support means;

means for suspending the paddle from the support means so that the paddle is displaceable with respect to said support means;

the means for suspending the paddle from the support means including a pair of compliant beams;

the compliant beams having longitudinal axes that are substantially orthogonal to each other, whereby the beams provide compliant isolation to internal forces while being rigid to external loading forces; and wherein:

the cross-over point of the orthogonal beam axes in coincident with the center of mass of a supported mass, whereby a rotational moment due to external cross-axis loading is substantially zero.

7. The accelerometer as described by claim 5, wherein:

a mode of loading of the beams due to external loading forces is substantially a tension mode for one of the pair of beams and substantially a compression mode for the other of the pair of beams, whereby the beams are rigid to said external loading forces.

8. The accelerometer as described by claim 5, wherein:

internal stress forces are applied laterally to the beams in the direction of compliance of said beams.

9. An accelerometer comprising:

an upper stator;

a lower stator; and a reed having:
 a paddle;
 an outer annular support ring;
 flexures for pivotably coupling said paddle to said outer annular support ring, wherein said paddle is pivotable; with respect to said support ring;
 said support-ring including compliant beams having longitudinal axes in the plane of said paddle that are substantially orthogonal to each other; and
 said support ring having a mounting pad for coupling said support ring to said stators.

10. An accelerometer comprising:

an upper stator;

a lower stator; and a reed having:
 a paddle;
 an outer annular support ring;
 flexures for pivotably coupling said paddle to said outer annular support ring, wherein said paddle is pivotable; with respect to said support ring;
 said support ring including compliant beams having longitudinal axes that are substantially orthogonal to each other; wherein the cross over point of the orthogonal beam axes is coincident with the center of mass of a supported mass, whereby rotational moment due to external cross-axis loading is substantially zero; and
 said support ring having a mounting pad for coupling said support ring to said stators.

* * * * *